(12) United States Patent
Garza et al.

(10) Patent No.: US 7,493,527 B2
(45) Date of Patent: Feb. 17, 2009

(54) METHOD FOR LOGGING DIAGNOSTIC INFORMATION

(75) Inventors: Jose Emir Garza, Richmond (GB); Richard David Johnson, Southampton (GB); Christopher Colin Paice, Chandlers Ford (GB); Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 594 days.

(21) Appl. No.: 11/136,160

(22) Filed: May 24, 2005

(65) Prior Publication Data

US 2005/0278706 A1 Dec. 15, 2005

(30) Foreign Application Priority Data

Jun. 10, 2004 (GB) ................................. 0412943.3

(51) Int. Cl.
*G06F 11/00* (2006.01)
(52) U.S. Cl. .......................................... 714/48; 714/38
(58) Field of Classification Search .................... 714/48, 714/38, 39, 46; 717/124, 126, 128
See application file for complete search history.

(56) References Cited

U.S. PATENT DOCUMENTS

| | | | | |
|---|---|---|---|---|
| 3,704,363 A | * | 11/1972 | Salmassy et al. ............. | 714/704 |
| 4,462,077 A | * | 7/1984 | York ............................ | 714/45 |
| 5,355,484 A | * | 10/1994 | Record et al. ................ | 717/127 |
| 5,379,406 A | * | 1/1995 | Wade ........................... | 703/21 |
| 7,181,728 B1 | * | 2/2007 | Thekkath ..................... | 717/128 |
| 2003/0192034 A1 | * | 10/2003 | Hayase ......................... | 717/128 |
| 2004/0078724 A1 | * | 4/2004 | Keller et al. .................. | 714/48 |

OTHER PUBLICATIONS

Sun Microsystems, Enterprise JavaBeansTM Specification, Nov. 24, 2003, Version 2.1.*

* cited by examiner

*Primary Examiner*—Dieu-Minh Le
(74) *Attorney, Agent, or Firm*—Duke W. Yee; Robert Straight; Gerald H. Glanzman

(57) ABSTRACT

Method for logging diagnostic information, for use in a transactional environment having function for sending a transactional and re-sendable request to an application program. A counter is associated with the request, wherein a value associated with the counter is updated when an error occurs in the environment. The environment also comprises a counter threshold. The method utilizes a comparator, responsive to sending the request, for comparing the value associated with the counter against the counter threshold; a tracing control component, responsive to the value associated with the counter meeting the counter threshold, for enabling a tracing program; and a logging component, responsive to re-sending the request, for logging diagnostic information generated by the tracing program.

6 Claims, 4 Drawing Sheets

METHOD FOR LOGGING DIAGNOSTIC INFORMATION

FIELD OF THE INVENTION

The present invention relates logging diagnostic information without incurring the penalty that occurs with an always-on trace.

BACKGROUND

In order to assist application developers during the development cycle of an application program, or service personnel during use of the application program, to determine the cause of a problem or the reason for unexpected behavior of the application program, it is known to generate and store diagnostic information for subsequent analysis. Such diagnostic information typically consists of information produced in response to events occurring within the environment that supports the application program.

The type of diagnostic information to be captured is usually left up to the application developer, but there is a requirement for such diagnostic information to be detailed enough to aid with debugging (e.g. problem determination and source identification), should unexpected behavior, or a crash, occur.

There are known solutions to this requirement. One solution is to continuously trace an application program while it executes. Tracing operations track sequences of events during execution of an application program. Such events or states are often stored in a trace table or in trace files in memory. The trace of an application program is valuable in component debugging, fine-tuning, performance analysis, and for data capture needed at a runtime crash. Thus, tracing an application program continuously results in a continual production of trace data, which is stored and then output when required. However, activating a trace degrades overall system performance and steals resources from other vital tasks.

Another solution is problem re-creation, wherein an application program initially runs without any tracing enabled. This has the advantage of enhanced performance, but the disadvantage that, when a problem occurs, diagnostic information is not available. If a problem occurs, a user manually enables tracing and reruns the application program under the same or similar conditions in order to re-create the problem. Now, if the problem reoccurs, diagnostic information will be available. This approach has the disadvantage that it is difficult to reproduce a problem, as replicating the initial conditions that caused a problem can be complicated, time consuming, and erroneous.

SUMMARY

According to a first aspect, the present invention provides a system for logging diagnostic information, for use in a transactional environment having: means for sending a transactional and re-sendable request to an application program; a counter associated with the request, wherein a value associated with the counter is updated when an error occurs in the environment; and a counter threshold. The system comprises: a comparator, responsive to sending the request, for comparing the value associated with the counter against the counter threshold; a tracing control component, responsive to the value associated with the counter meeting the counter threshold, for enabling a tracing program; and a logging component, responsive to re-sending the request, for logging diagnostic information generated by the tracing program.

Preferably, the tracing component, responsive to the logging of diagnostic information, disables the tracing program, so that a performance overhead is not incurred if the system is re-executed. In a preferred embodiment, the tracing component is executed prior to a request being sent, causing the tracing program to be disabled, so that a performance overhead is not incurred when the system is executed. Preferably, the system also comprises means, responsive to the value associated with the counter exceeding the counter threshold, for executing a debugging component (e.g. an alert to the administrator). In a preferred embodiment, the system further comprises means for configuring the counter threshold.

In a preferred embodiment, the counter threshold is associated with the application program. Preferably, in an asynchronous environment, the application program comprises an associated communication entity that passes a request to the application program. This prevents the need for the request and application program to execute concurrently. In another preferred embodiment, the counter threshold is associated with the communication entity. Preferably, the level of tracing (for example, a full trace of the environment, a partial trace of the environment, etc.) can be configured.

In one example of the preferred embodiment, the request is an asynchronous message and the application program is a message flow. In another example of the preferred embodiment, the request is an asynchronous message and the application program is an Enterprise JavaBean.

According to a second aspect, the present invention provides a method for logging diagnostic information, for use in a transactional environment having: means for sending a transactional and re-sendable request to an application program; a counter associated with the request, wherein a value associated with the counter is updated when an error occurs in the environment; and a counter threshold. The method comprises the steps of: in response to sending the request, comparing the value associated with the counter against the counter threshold; in response to the value associated with the counter meeting the counter threshold, enabling a tracing program; and in response to re-sending the request, logging diagnostic information generated by the tracing program.

According to a third aspect, the present invention provides a computer program comprising program code means adapted to perform all the steps of the method described above when the program is run on a computer.

Advantageously, the present invention allows for transactional environments to operate with optimal performance, by operating with tracing disabled and to operate with serviceability, by producing and logging diagnostic information when an error occurs.

BRIEF DESCRIPTION OF THE DRAWINGS

The present invention will now be described, by way of example only, with reference to preferred embodiments thereof, as illustrated in the following drawings.

DETAILED DESCRIPTION

Figure 1:
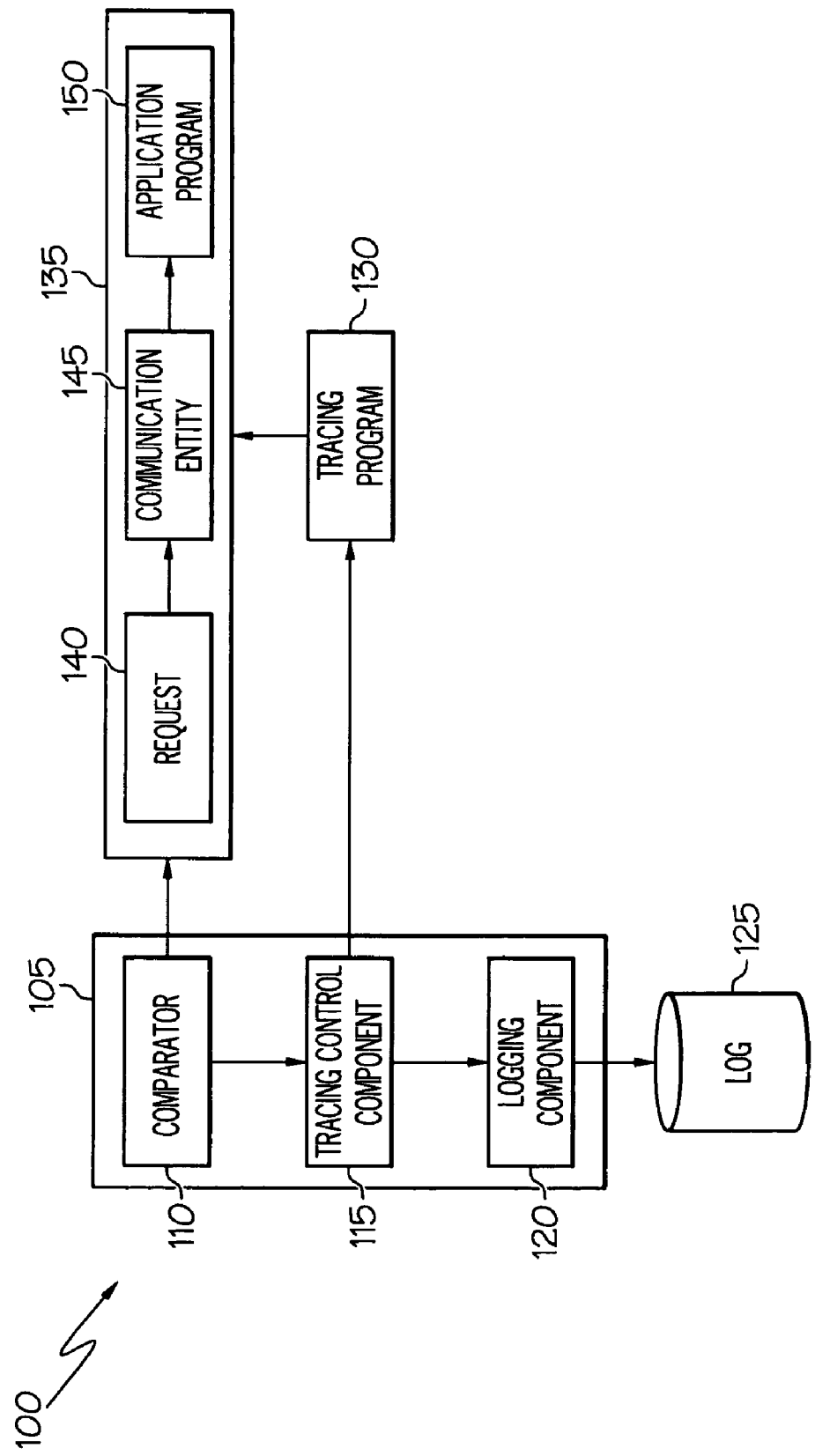
FIG. 1 is a schematic diagram of a data processing system in which the present invention may be implemented.

FIG. 1 shows a system (100) in which the present invention may be implemented. The system comprises a transactional environment (135) wherein a request (140) is sent via a communication entity (145) to an application program (150), wherein the communication entity (145) is associated with the application program (150). Transference of requests carried out under transaction control gives assured once and once-only (i.e. atomic) delivery of requests even in the event of system or communications failures. In the transactional environment described herein, each request is identifiable and if an error occurs in the environment (135), the request is still available, after the error has occurred, for re-sending (i.e. retrying) to the application program.

An error count is associated with the environment (135). The error count is updated (e.g. incremented or decremented) each time an error occurs in the environment (135). That is, the error count is associated with a point of failure in the environment (135). In the embodiments described herein, the error count is incremented each time an error occurs in the environment. In the embodiments described herein, the error count is associated with the request (140).

An error count threshold is associated with the environment (135). In the embodiments described herein, the error count threshold is associated with the application program (150) (i.e. with the communication entity (145)). The error count threshold allows the number of retries of failed requests to be specified. Preferably, the error count threshold is configurable by, for example, a user or a computer system (120).

The system (100) also comprises a diagnostic system (105) comprising a comparator (110), which compares the error count against the error count threshold and a tracing control component (115), which communicates with a tracing program (130) in order to enable or disable the tracing program (130). The tracing program (130) performs traces on one or more components (e.g. 140, 145, 150) in the environment (135). The diagnostic system (105) also comprises a logging component (120), which communicates with a log (125), for example, a trace table or a trace file. The log stores diagnostic information collected from a trace carried out by the tracing program (130).

Figure 2:
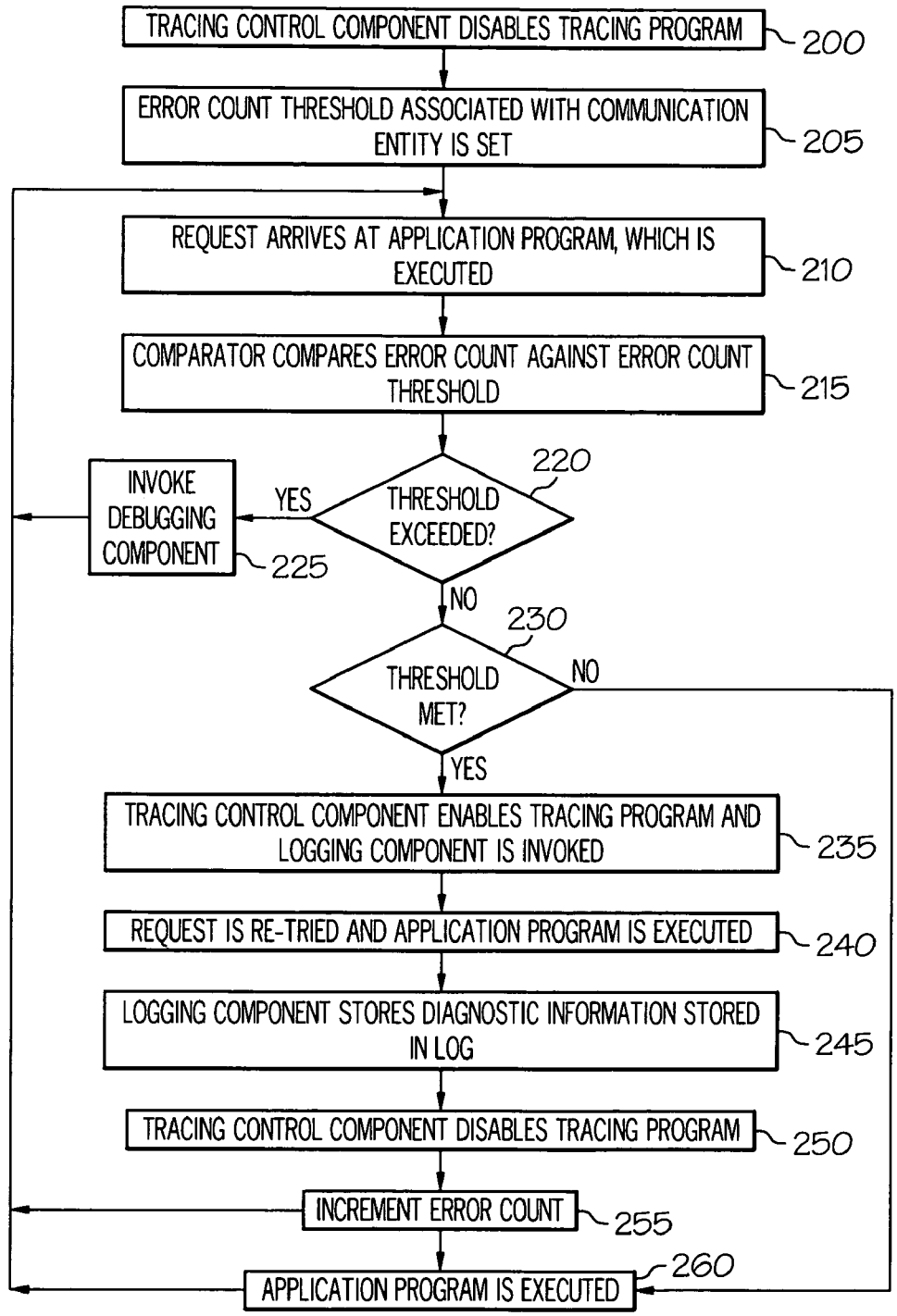
FIG. 2 is a flow chart showing the operational steps involved in a process according to the present invention.

A process according to a preferred embodiment is described with reference to FIG. 2. In step 200, the tracing control component (115) disables the tracing program (130), so that the process continues without a performance overhead. In step 205, the error count threshold associated with the communication entity (145) is set by, for example, a user or by a computer system. Next, in step 210, a request (140) arrives at the application program (150), via the communication entity (145). The request causes the application program (150) to execute. When the request (140) is sent, the comparator (110) monitors (step 215) the error count threshold by comparing the error count against the error count threshold, in order to determine (step 220) whether the error count threshold has been exceeded.

If the error count threshold has not been exceeded (negative result to step 220), the process passes to step 230, wherein a determination is made as to whether the error count threshold has been met. If the error count threshold has not been met (negative result to step 230), this indicates that the environment (135) is functioning within normal bounds and therefore the application program (150) continues to execute (step 260), with the tracing program (130) disabled. The process then passes to step 210, where another request arrives at the application program (150) and the process is repeated.

With reference to step 220, if the error count threshold has not been exceeded (negative result to step 220), but the error count threshold has been met (positive result to step 230) (i.e. the error count has been incremented to a value such that the error count threshold is met), then in this case, the request is made available for retry, such that the conditions in the environment are the same as when the request was initially sent. The tracing control component (115) is invoked (step 235) so that the tracing program (130) is enabled and the logging component (120) is also invoked.

In step 240, the request that was made available for re-try is re-sent, and thus the application program (150) is again executed. The tracing program (130) executes a trace and generates diagnostic information. It should be understood, that at this stage, the request may complete successfully. However, if an error occurs again this time, since the tracing program (130) has been enabled, in step 245, diagnostic information (associated with the environment) collected from the trace carried out by the tracing program (130) is stored in a log (125) by the logging component (120). Next, the tracing control component (115) disables (step 250) the tracing program (130), so that when another request arrives (step 210) at the application program (150), a performance overhead is not incurred. The error count is then incremented at step 255.

With reference to step 220, if the error count threshold has been exceeded (positive result to step 220), (i.e. the error count is incremented to a value such that the error count threshold is exceeded), in this embodiment, the steps that follow a positive result to step 230 have already been executed. That is, the tracing control component (115) has already been invoked once, diagnostic information has been collected from the tracing program, and any actions that have been taken (e.g. based on the diagnostic information) have not solved the error, because it has occurred again. In this case, a debugging component is invoked (step 225) (in one example, an alert is sent to the developer, in another example, the request is discarded etc.).

A first example of a preferred embodiment will now be described. Asynchronous communication models are well known, such as implemented by a number of commercially available message-oriented middleware products, including IBM Corporation's WebSphere MQ (IBM and WebSphere are registered trademarks of International Business Machines Corporation), which uses asynchronous messaging via queues. Message queuing is a method of application-to-application communication. Application programs communicate by writing and retrieving application-specific data (messages) to and from queues, without having a private, dedicated connection to link them. Messaging allows application programs to communicate with each other by sending data in messages (i.e. requests) rather than by calling each other directly, which is the case for technologies such as remote procedure calls. Queuing allows application programs to communicate through queues (i.e. a communication entity), thus removing the requirement for both the sending and receiving application programs to be executing concurrently.

Figure 3:
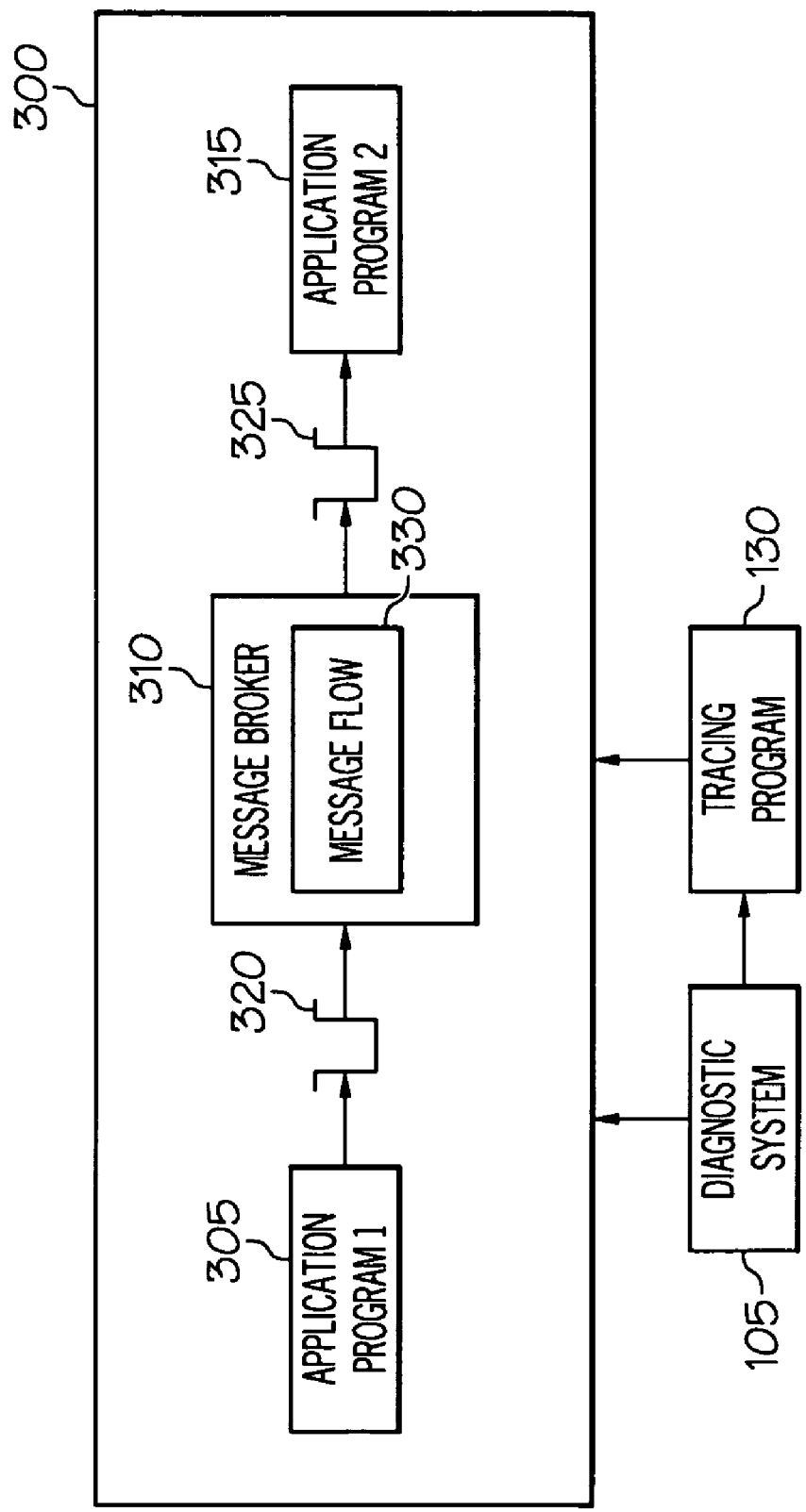
FIG. 3 is a schematic diagram of a data processing system in which the present invention may be implemented, according to one example.

With reference to FIG. 3, an asynchronous, transactional environment (300) is shown. The environment comprises a message broker (310), such as International Business Machines Corporation's WebSphere Business Integration Message Broker, which is an application program that enables messages to flow between other application programs (305, 315), using the message queuing mechanism. A message broker mediates between message transports and message formats and routes messages using for example, WebSphere MQ, between application programs (305, 315). In this example, application program 1 (305) sends messages to the message broker (310) using an input queues (320) and the message broker (310) puts the messages on an output queue (325), so that the messages can be retrieved by application program 2 (315). It should be understood that application program 2 (315) can also send messages to application program 1 (305).

A message flow (330) (i.e. an application program) represents a set of actions that can be executed by a message broker (e.g. removing a message from an input queue (320)), performing operations on the message, placing a message on an output queue (325)). Errors can occur in the asynchronous environment, for example, due to a failure in the message broker, due to an error in the message, etc. Currently, when an error occurs in the message flow (330), for example, when removing a message from an input queue (320), the message broker backs out the message, such that the conditions are the same as when the message arrived on the input queue (320) (that is, the message is rolled back to the input queue (320)). The message is made available for retry, so that the message can be processed again.

The input queue (320) has an associated error count threshold and messages have an associated error count. Each time a message is backed out, its associated error count is incremented. Currently, if the threshold has not yet been exceeded, the message is processed again. If the threshold has been exceeded, the broker (310) puts the message, without processing, in a failure queue. Human intervention is then required, and, disadvantageously, no diagnostic information is available.

The first example will now be described, with reference to FIG. 2 and the system shown in FIG. 3. In step 200, the tracing control component (115) disables the tracing program (130) and in step 205, an error count threshold associated with the input queue (320) is set. As described above, each message has an associated error count.

Next, in step 210, a message is sent and arrives at the broker (310) via the input queue (320), causing the message flow (330) to execute. When the message is sent, the comparator (110) monitors (step 215) the error count threshold associated with the input queue (320) by comparing the error count of the message against the error count threshold, in order to determine (step 220) whether the error count threshold has been exceeded.

If the error count threshold has not been exceeded (negative result to step 220), the process passes to step 230, wherein a determination is made as to whether the error count threshold has been met. If the error count threshold has not been met (negative result to step 230), this indicates that the environment (300) is functioning within normal bounds, and therefore the message flow (330) continues to execute (step 260), with the tracing program (130) disabled. The process then passes to step 210, as described above.

With reference to step 220, if the error count threshold has not been exceeded (negative result to step 220), but has been met (positive result to step 230) then in this case, the message is backed out and is made available for retry. The tracing control component (115) is invoked (step 235) so that the tracing program (130) is enabled and the logging component (120) is invoked.

In step 240, the message that was made available for re-try is re-sent from the input queue (320), causing the broker (310), and thus the message flow (330), to again be executed. Since the tracing program (130) has been enabled, in step 245, diagnostic information can be collected and stored in a log (125). Next, the tracing control component (115) disables (step 250) the tracing program (130), so that when another message arrives (step 210) at the broker (310), a performance overhead is not incurred. At step 255, the error count is incremented and the process then passes to step 2110, as described above.

Figure 4:
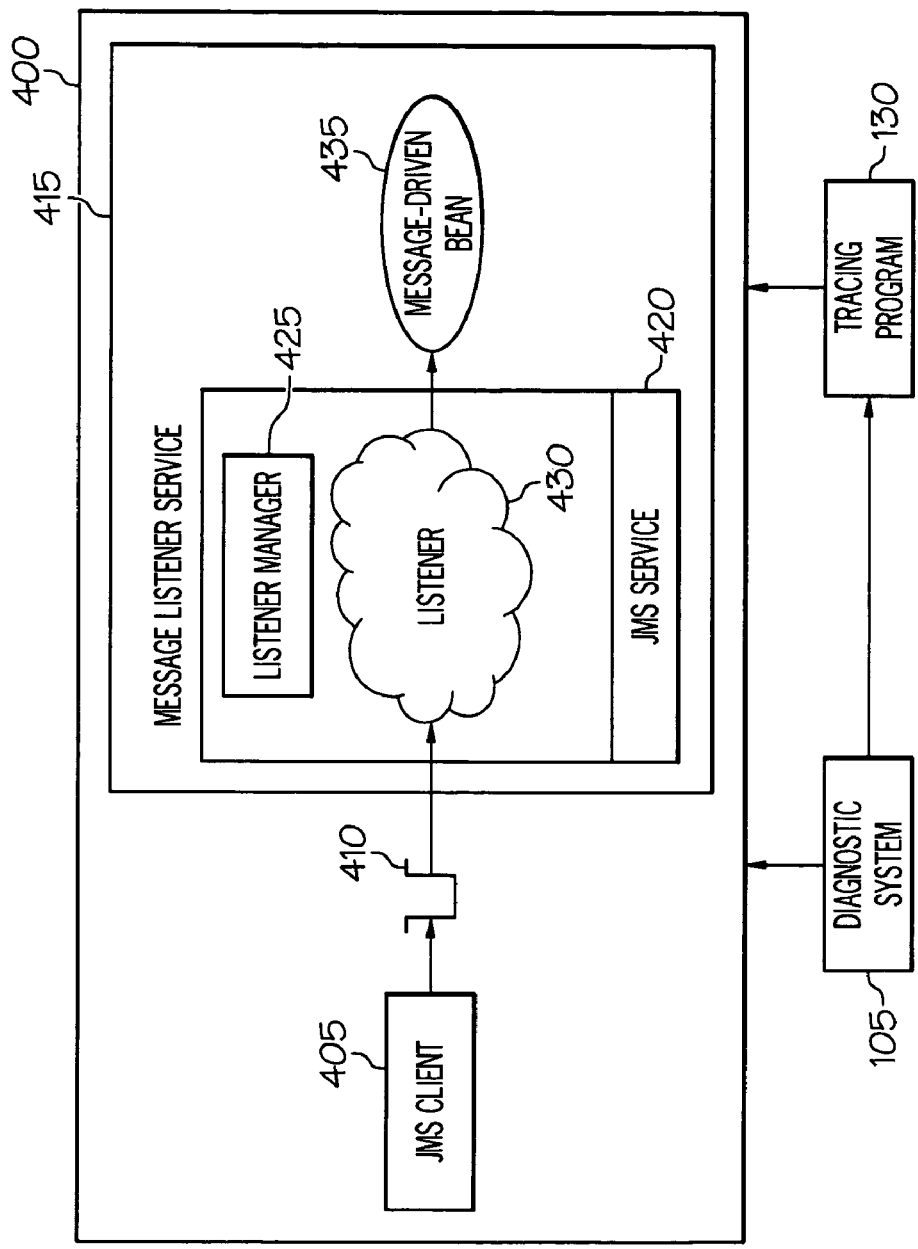
FIG. 4 is a schematic diagram of a data processing system in which the present invention may be implemented, according to another example.

A second example of the preferred embodiment will now be described with reference to FIGS. 2 and 4. Java 2 Platform, Enterprise Edition (J2EE) defines a standard that applies to all aspects of designing, developing, and deploying multi-tier, server-based applications. (Java and all Java-based trademarks are trademarks of Sun Microsystems, Inc. in the United States, other countries, or both).

The J2EE programming model comprises an application component known as an Enterprise JavaBean (EJB) as defined in the EJB 2.0 specification. The EJB specification defines three types of EJBs, known as session beans, entity beans, and message-driven beans. A session bean is created by a client and usually exists only for the duration of a single client and server session, an entity bean represents persistent data maintained in a database, and a message-driven bean provides asynchronous message support.

International Business Machines Corporation's WebSphere Application Server (WAS) (415) provides a transactional application deployment environment (400) with a set of application services. WAS supports asynchronous messaging based on the Java Messaging Service (JMS) programming interface. JMS provides a common way for Java programs (clients and J2EE applications) to create, send, receive, and read asynchronous requests, as JMS messages. This enables WebSphere J2EE applications, as JMS clients (405), to exchange JMS messages asynchronously with other JMS clients by using JMS destinations (410).

WAS supports asynchronous messaging by using message-driven beans (435) (i.e. an application program), JMS listeners (430) and a message listener service (i.e. a communication entity) (which are part of the facilities of a JMS application server (420)). The message listener service provides a listener manager (425), which controls and monitors a JMS listener (430).

Each JMS listener (430) monitors a JMS destination (410) for incoming JMS messages. When a JMS message arrives on the JMS destination (410), the JMS listener (430) retrieves it and passes the JMS message to a message-driven bean (435) for processing. The message-driven bean may pass the JMS message onto another application component (e.g. a session bean or an entity bean) for further processing. The message listener service comprises a configurable threshold "MAX.RECOVERY.RETRIES", and a JMS message comprises an associated error count.

Currently, when an error occurs, the JMS message is backed out, such that the conditions are the same as when the JMS message arrived on the JMS destination (that is, the JMS message is roll backed to the JMS destination). Since the JMS message is available for retry, the JMS message can be processed again (i.e. the JMS message is re-tried).

Each time a JMS message is backed out, its associated error count is incremented. Currently, if the MAX.RECOVERY.RETRIES threshold has not yet been exceeded, the JMS message is processed again. If the MAX.RECOVERY.RETRIES threshold has been exceeded, an action is invoked; for example, an alert is sent to the developer. Disadvantageously, no diagnostic information is available.

The second example is now described with reference to FIGS. 2 and 4. In step 200, the tracing control component (115) disables the tracing program (130). In step 205, the MAX.RECOVERY.RETRIES threshold is configured. As described above, each JMS message has an associated error count.

Next, in step 210, a JMS message is sent and arrives at the message-driven bean (435) from the JMS destination (410), via the listener (430). The JMS message causes the message-driven bean (435) to execute. When the message is sent, the comparator (110) monitors (step 215) the MAX.RECOVERY.RETRIES threshold by comparing the error count against the MAX.RECOVERY.RETRIES threshold, in order to determine (step 220) whether the MAX.RECOVERY.RETRIES threshold has been exceeded.

If the MAX.RECOVERY.RETRIES threshold has not been exceeded (negative result to step 220), the process passes to step 230, wherein a determination is made as to whether the MAX.RECOVERY.RETRIES threshold has been met. If the MAX.RECOVERY.RETRIES threshold has not been met (negative result to step 230), this indicates that the environment (400) is functioning within normal bounds, and therefore the message-driven bean (435) continues to execute (step 260), with the tracing program (130) disabled. The process then passes to step 210.

With reference to step 220, if the MAX.RECOVERY.RETRIES threshold has not been exceeded (negative result to step 220), but has been met (positive result to step 230), then in this case, the JMS message is backed out (i.e. rolled back to the JMS destination (410)) and is made available for retry. The tracing control component (115) is invoked (step 235) so that the tracing program (130) is enabled and the logging component (120) is invoked.

In step 240, the JMS message that was made available for re-try is re-sent, and thus the message-driven bean (435) is again executed. Since the tracing program (130) has been enabled, in step 245, diagnostic information can be collected and stored in a log (125). Next, the tracing control component (115) disables (step 250) the tracing program (130), so that when another JMS message arrives (step 210) at the message-driven bean (435), a performance overhead is not incurred. At step 255, the error count is incremented.

In the prior art, an application program that executes with a tracing program being enabled continuously results in a performance overhead; if no errors occur, this overhead is unnecessary. Advantageously, the present invention allows for an application program to initially execute with the tracing program disabled, so that a performance overhead is not incurred. However, advantageously, the present invention still allows for the collection of diagnostic information, by enabling the tracing program only when an error count threshold has been met.

We claim:

1. A method for logging diagnostic information, suitable for use in a transactional environment, said method comprising:
    in response to sending a request to an application program, wherein the request is associated with a counter, and wherein a value associated with the counter is updated when an error occurs in the transactional environment, comparing the value associated with the counter against a counter threshold;
    in response to the value associated with the counter meeting the counter threshold, enabling a tracing program, and
    in response to re-sending the request, logging diagnostic information generated by the tracing program,
    wherein the request is an asynchronous message and the application program is an Enterprise JavaBean.

2. The method of claim 1, further comprising disabling the tracing program in response to the logging of diagnostic information.

3. The method of claim 1, further comprising disabling the tracing program prior to the request being sent.

4. The method of claim 1, further comprising executing a debugging component in response to the value associated with the counter exceeding the counter threshold.

5. The method of claim 1, further comprising configuring the counter threshold.

6. The method of claim 1, wherein the counter threshold is associated with the application program.

* * * * *